(12) United States Patent
Bhutani et al.

(10) Patent No.: US 8,437,133 B2
(45) Date of Patent: May 7, 2013

(54) LATCHING MODULE MOUNTING SYSTEM

(75) Inventors: Gurmeet S. Bhutani, Punjab (IN);
Li-Chung Liu, Zhongli (TW); Tung Yu Chien, Panchiao (TW)

(73) Assignee: Dell Products L.P., Round Rock, TX (US)

( * ) Notice: Subject to any disclaimer, the term of this patent is extended or adjusted under 35 U.S.C. 154(b) by 369 days.

(21) Appl. No.: 12/944,526

(22) Filed: Nov. 11, 2010

(65) Prior Publication Data

US 2012/0120587 A1 May 17, 2012

(51) Int. Cl.
*G06F 1/16* (2006.01)

(52) U.S. Cl.
USPC .............................. 361/679.58; 361/679.33

(58) Field of Classification Search ............. 361/679.58, 361/679.33; 248/220.21
See application file for complete search history.

(56) References Cited

U.S. PATENT DOCUMENTS

| | | | | |
|---|---|---|---|---|
| 5,825,616 | A * | 10/1998 | Howell et al. ............. | 361/679.38 |
| 6,178,084 | B1 * | 1/2001 | Shibasaki ................. | 361/679.33 |
| 6,643,139 | B2 * | 11/2003 | Tien ............................. | 361/727 |
| 6,678,154 | B2 * | 1/2004 | DeLuga ................... | 361/679.58 |
| 6,751,093 | B1 * | 6/2004 | Hsu et al. ................. | 361/679.33 |
| 6,774,808 | B1 * | 8/2004 | Hibbs et al. ................. | 340/686.4 |
| 6,826,044 | B2 * | 11/2004 | Gan et al. ................. | 361/679.58 |
| 6,944,016 | B2 * | 9/2005 | Chen et al. ............... | 361/679.33 |
| 7,262,958 | B2 * | 8/2007 | Marroquin et al. ....... | 361/679.33 |
| 7,265,987 | B2 * | 9/2007 | Zhang et al. ................... | 361/727 |
| 7,359,187 | B2 * | 4/2008 | Hu et al. .................... | 361/679.33 |
| 7,382,609 | B2 * | 6/2008 | Zhang et al. ............. | 361/679.33 |
| 7,457,110 | B2 * | 11/2008 | Lo et al. .................... | 361/679.33 |
| 7,715,184 | B2 * | 5/2010 | Yang ........................ | 361/679.37 |
| 7,885,064 | B2 * | 2/2011 | Chen et al. ............... | 361/679.58 |
| 7,929,289 | B2 * | 4/2011 | Tseng ....................... | 361/679.39 |
| 8,118,270 | B2 * | 2/2012 | Hsieh et al. .............. | 248/220.21 |
| 2004/0125554 | A1 * | 7/2004 | DeLuga ........................ | 361/683 |
| 2007/0211424 | A1 * | 9/2007 | Liu et al. ....................... | 361/685 |

* cited by examiner

*Primary Examiner* — Lisa Lea Edmonds
(74) *Attorney, Agent, or Firm* — Haynes and Boone, LLP

(57) ABSTRACT

An information handling system (IHS) chassis defines a component housing. An IHS component is located in the component housing. The IHS component defines a module channel, a module chassis locating slot adjacent the module channel, and a pair of module chassis securing apertures adjacent the module channel. The IHS component includes a module chassis retaining surface that is spaced apart from the module channel. A module chassis is located in the module channel, includes a retaining wall that engages the module chassis retaining surface and a locating member that extends into the module chassis locating slot, and defines a module housing. The module chassis is secured to the component through the pair of module chassis securing apertures. A latching module is located in the module housing and secured to the module chassis. The latching module engages the IHS chassis to resist removal of the IHS component from the component housing.

20 Claims, 14 Drawing Sheets

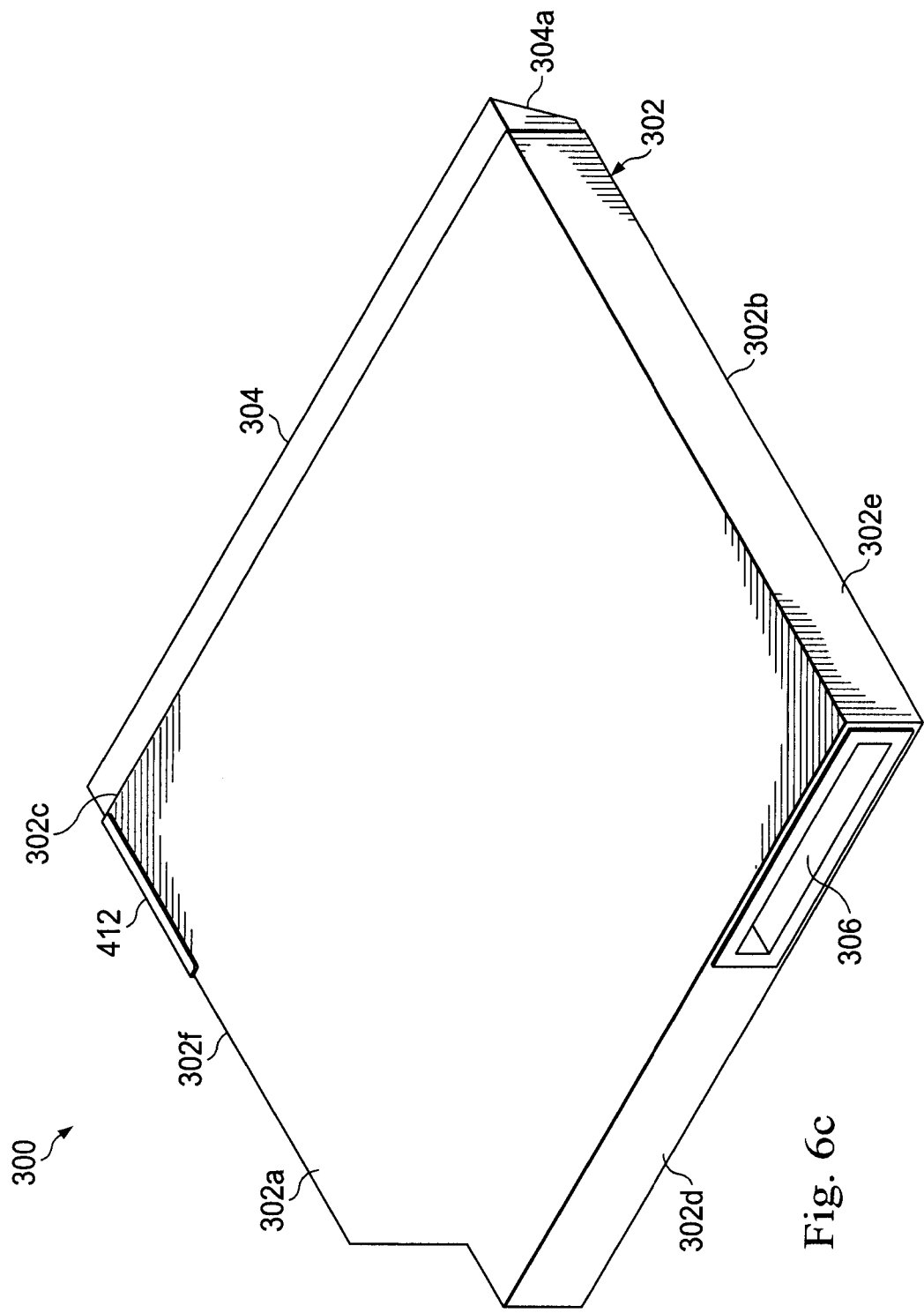

LATCHING MODULE MOUNTING SYSTEM

BACKGROUND

The present disclosure relates generally to information handling systems, and more particularly to a latching module mounting system for mounting a latching module to a component that couples to an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many IHSs includes component bays that may allow a variety of different components to be coupled to and/or removed from the IHS depending on the requirements of the user. For example, some IHSs include media component bays that allow media components such as Optical Disk Drives (ODDs) to be coupled to the IHS when the user would like to use optical disks with the IHS, and removed from the IHS when the user would either like to use a different media component or reduce the weight of the system. The coupling of these components to the IHS raises a number of issues.

Conventionally, a latching module is added to the component that is operable to be actuated to either hold the component in the IHS or allow the component to be removed from the IHS. However, these latching modules require a mounting structure that necessitates the customization of the component in order to provide the appropriate features that allow the mounting structure to be coupled to the component. The customization of the component in order to allow the mounting of the latching module increases the costs of the component.

Accordingly, it would be desirable to provide an improved latching module mounting system.

SUMMARY

According to one embodiment, an information handling system (IHS) includes an IHS chassis that defines a component housing and houses a processor that is coupled to a IHS connector that is located adjacent the component housing; an IHS component that is located in the component housing and coupled to the IHS connector, wherein the IHS component defines a module channel, a module chassis locating slot located adjacent the module channel, and a pair of module chassis securing apertures located adjacent the module channel, and wherein the IHS component includes a module chassis retaining surface that is spaced apart from the module channel; a module chassis that is located in the module channel, includes a retaining wall that engages the module chassis retaining surface and a locating member that extends into the module chassis locating slot, and defines a module housing, wherein the module chassis is secured to the component through the pair of module chassis securing apertures; and a latching module that is located in the module housing and secured to the module chassis, wherein the latching module engages the IHS chassis to resist removal of the IHS component from the component housing.

BRIEF DESCRIPTION OF THE DRAWINGS

FIG. 2b is a cross-sectional view illustrating an embodiment of the information handling system of FIG. 2a.

FIG. 3b is a bottom perspective view illustrating an embodiment of the component of FIG. 3a.

FIG. 4b is a bottom perspective view illustrating an embodiment of the module chassis of FIG. 4a.

FIG. 6c is a top perspective view illustrating an embodiment of the module chassis of FIGS. 4a, 4b, and 4c, coupled to the component of FIGS. 3a, 3b, and 3c.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
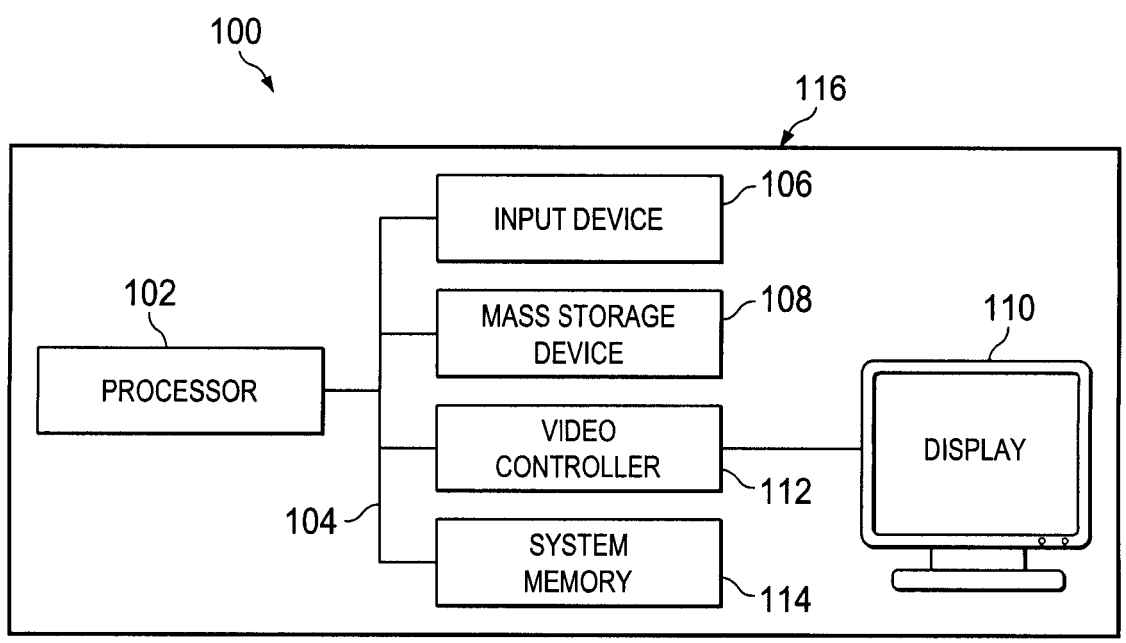
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
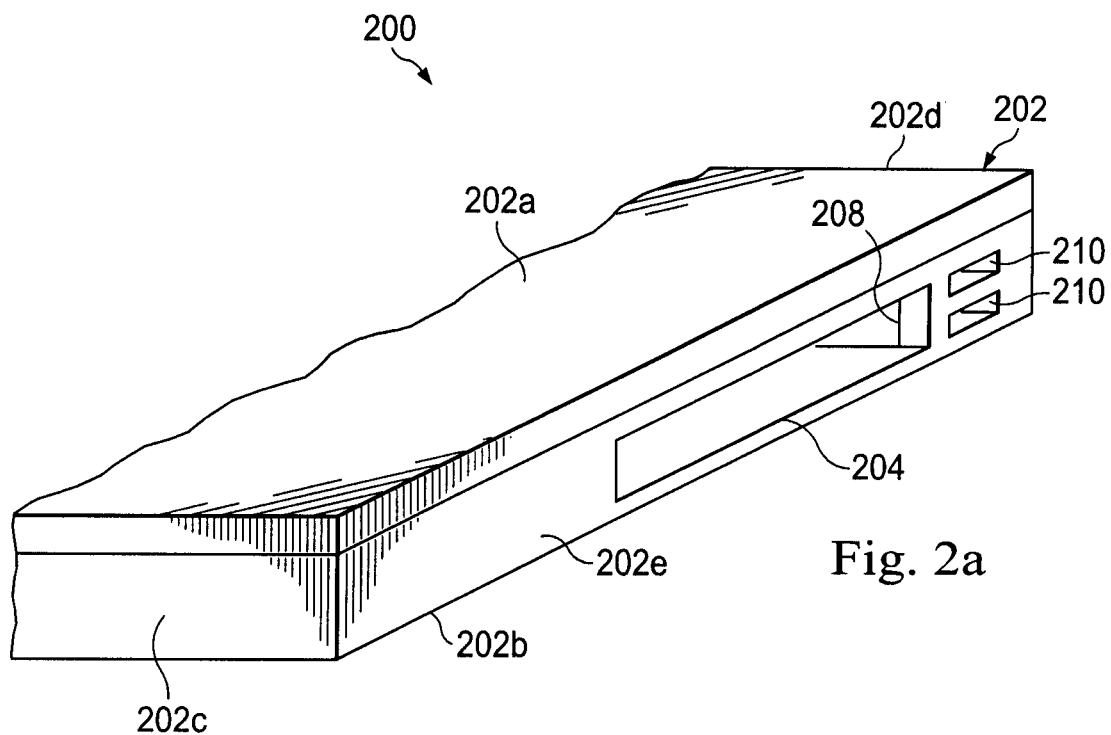
FIG. 2a is a perspective view illustrating an embodiment of the information handling system of FIG. 1.
Figure 2B:
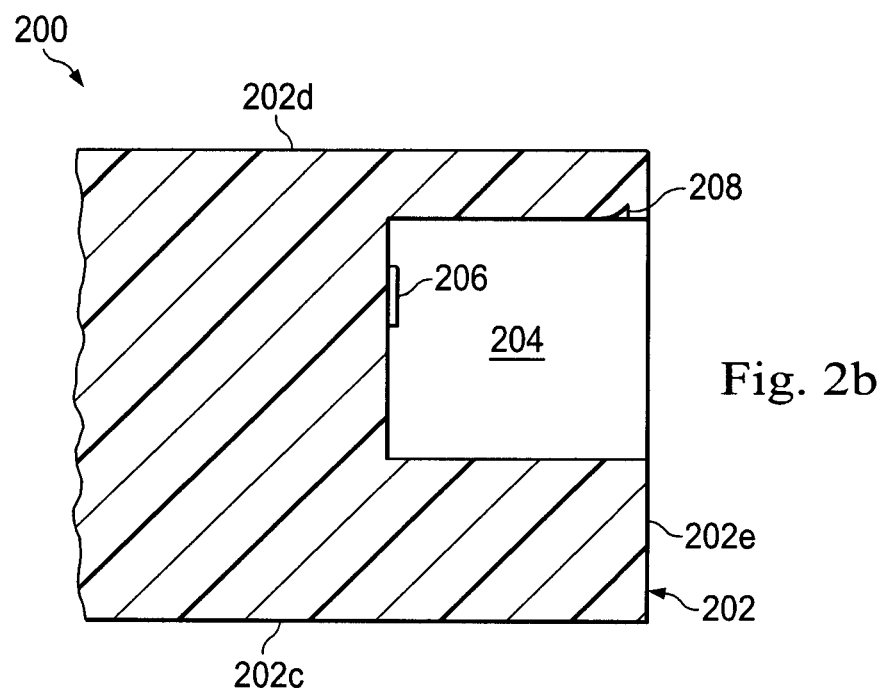

Referring now to FIGS. 2a and 2b, an IHS 200, which may be the IHS 100 described above with reference to FIG. 1, is illustrated. The IHS 200 includes an IHS chassis 202 having a top surface 202a, a bottom surface 202b located opposite the IHS chassis 202 from the top surface 202a, a front surface 202c extending between the top surface 202a and the bottom surface 202b, a rear surface 202d located opposite the IHS chassis 202 from the front surface 202c, and a side surface 202e extending between the top surface 202a, the bottom surface 202b, the front surface 202c, and the rear surface 202d. The IHS chassis 202 defines a component housing 204 that extends into the IHS chassis 202 from the side surface 202e. An IHS connector 206 is located adjacent the component housing 204 and is coupled to a processor such as, for example, the processor 102 described above with reference to FIG. 1, that is housed in the IHS chassis 202a. A latch engagement feature 208 is defined by the IHS chassis 202a and is located adjacent the component housing 204 and the side surface 202e. The IHS 200 may includes a plurality of connectors such as, for example, the plurality of Universal Serial Bus (USB) connectors 210 in the illustrated embodiment, and/or a variety of other connectors known in the art.

Figure 3A:
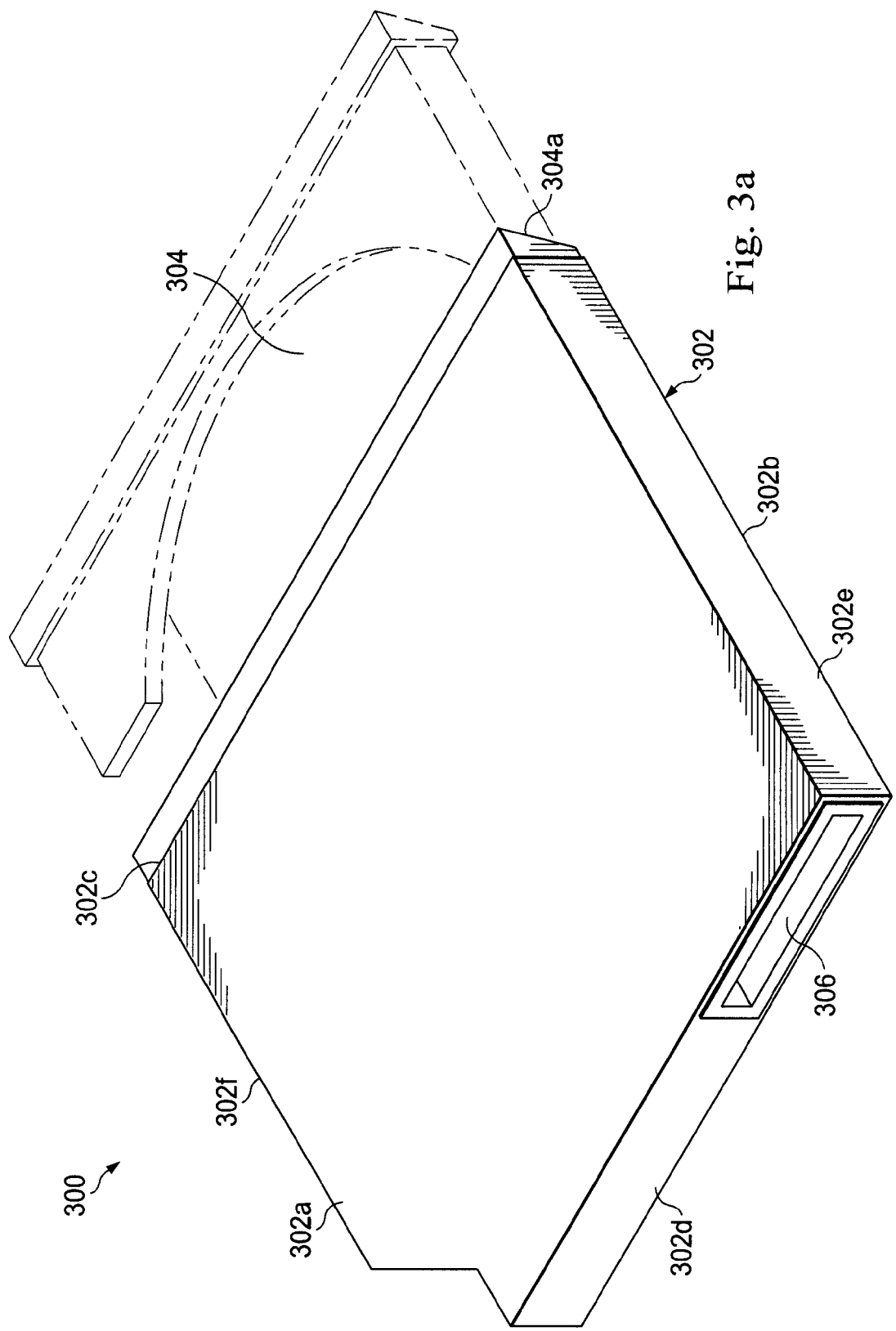
FIG. 3a is a top perspective view illustrating an embodiment of a component used with the information handling system of FIGS. 2a and 2b.
Figure 3B:
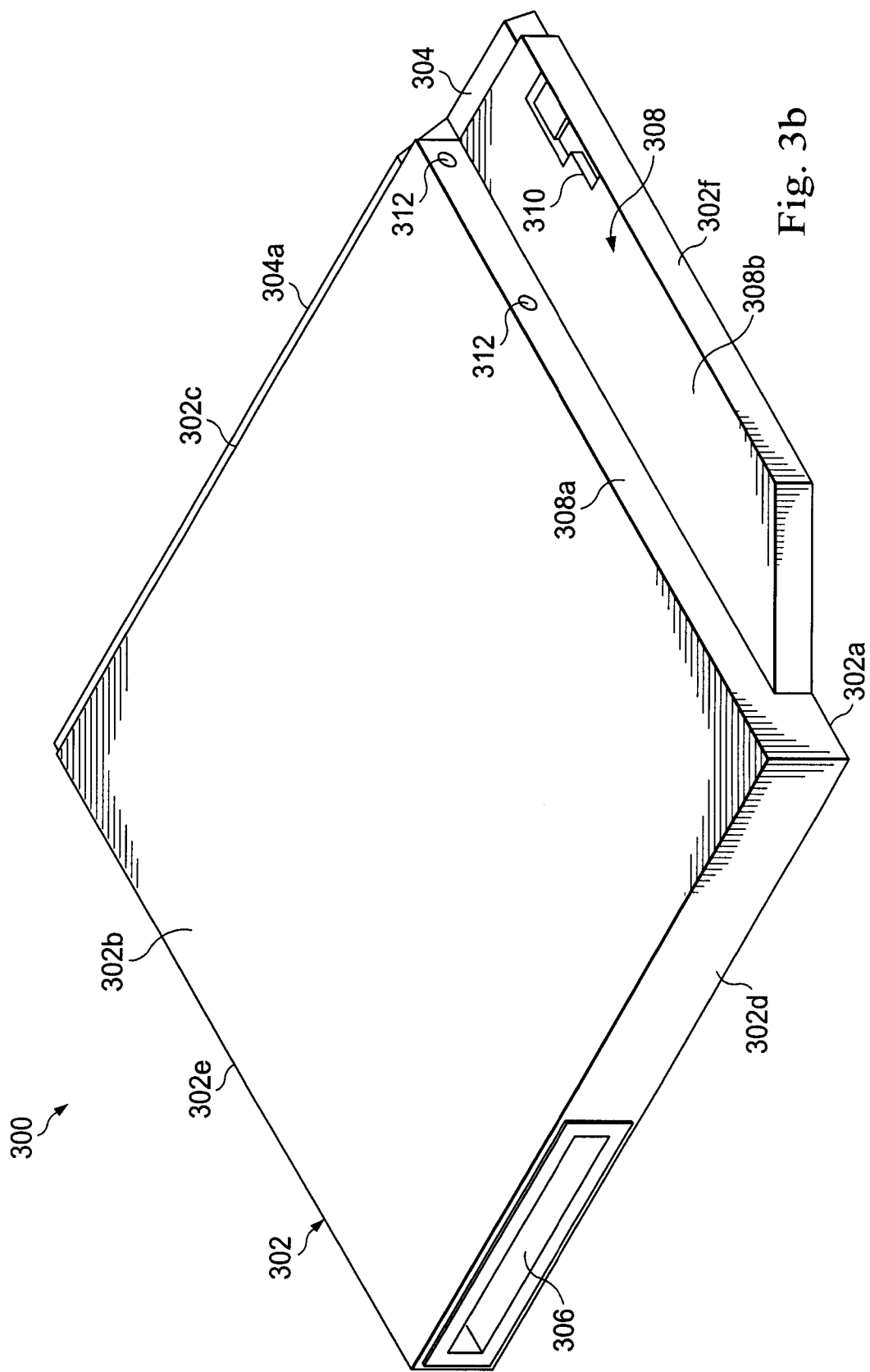
Figure 3C:
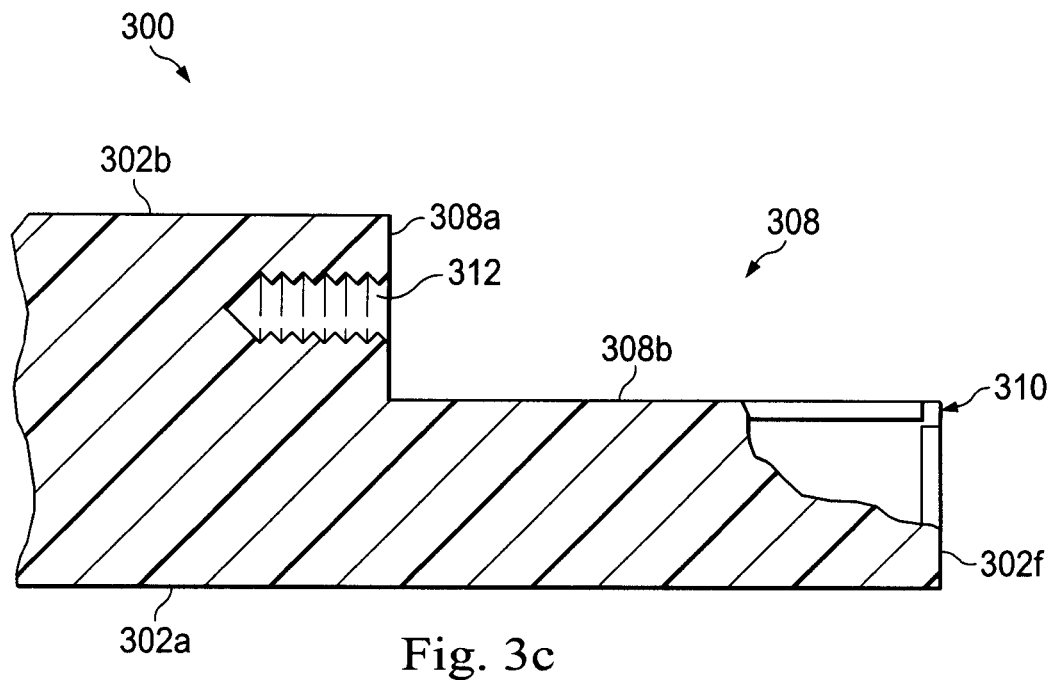
FIG. 3c is a cross-sectional view illustrating an embodiment of the component of FIGS. 3a and 3b.

Referring now to FIGS. 3a, 3b, and 3c, an IHS component 300 is illustrated. In the illustrated embodiment, the component 300 is an Optical Disk Drive (ODD). However, one of skill in the art will recognize that a variety of IHS components may be used without departing from the scope of the present disclosure. The component 300 includes a component chassis 302 having a top surface 302a, a bottom surface 302b located opposite the component chassis 302 from the top surface 302a, a front surface 302c extending between the top surface 302a and the bottom surface 302b, a rear surface 302d located opposite the component chassis 302 from the front surface 302c, and a pair of opposing side surfaces 302e and 302f extending between the top surface 302a, the bottom surface 302b, the front surface 302c, and the rear surface 302d. A component tray 304 (illustrated by the dotted lines in FIG. 3a) is moveably coupled to and operable to be housed in and extend from the component chassis 302. The component tray 304 includes a tray face 304a that is located adjacent the front surface 302c of the component chassis 302 when the component tray 304 is housed in the component chassis 302. A component connector 306 is located adjacent the rear surface 302d of the component chassis 302. A module channel 308 is defined by a first surface 308a and a second surface 308b on the component chassis 302 and extends into the component chassis 302 from the bottom surface 302b, the front surface 302c, and the side surface 302f, as illustrated in FIG. 3b. A module chassis locating slot 310 is defined by the component chassis 302 and extends into the component chassis 302 from second surface 308b adjacent the module channel 308 and/or the side surface 302f of the component chassis 302. A plurality of module chassis securing apertures 312 are defined by the component chassis 302 and extend into the component chassis 302 from the first surface 308a adjacent the module channel 308. In an embodiment, the component 300 is an industry standard ODD and the component chassis 302 is an industry standard structure that includes the module chassis locating slot 310 and the module chassis securing apertures 312, i.e., ODDs across a variety of suppliers will all include substantially the same dimensions for the component chassis 302, and the module chassis locating slot 310 and the module chassis securing apertures 312 are located in the same positions on ODDs across various suppliers, as is illustrated in FIGS. 3a, 3b, and 3c. Thus, ODDs will not require any customization in order to allow the components discussed below to be coupled to the ODD, which allows the latching module system described below to be provided on industry standard ODDs provided by various suppliers, thereby reducing costs associated with the previous need for customized ODDs to accept mounting structures for the latching module.

Figure 4A:
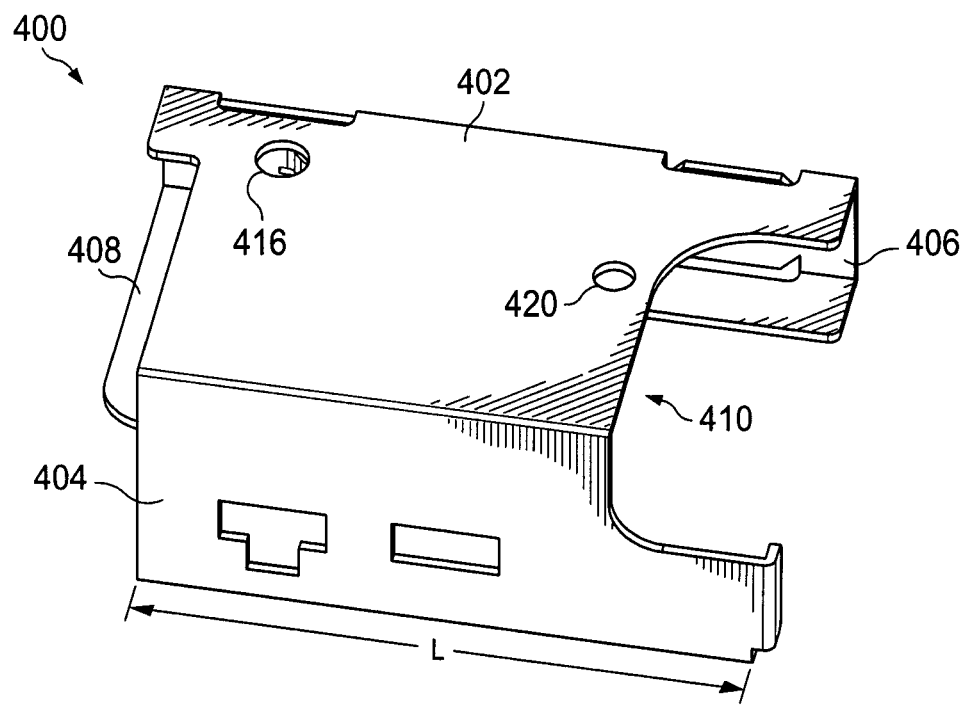
FIG. 4a is a top perspective view illustrating an embodiment of a module chassis used with the component of FIGS. 3a, 3b, and 3c.
Figure 4B:
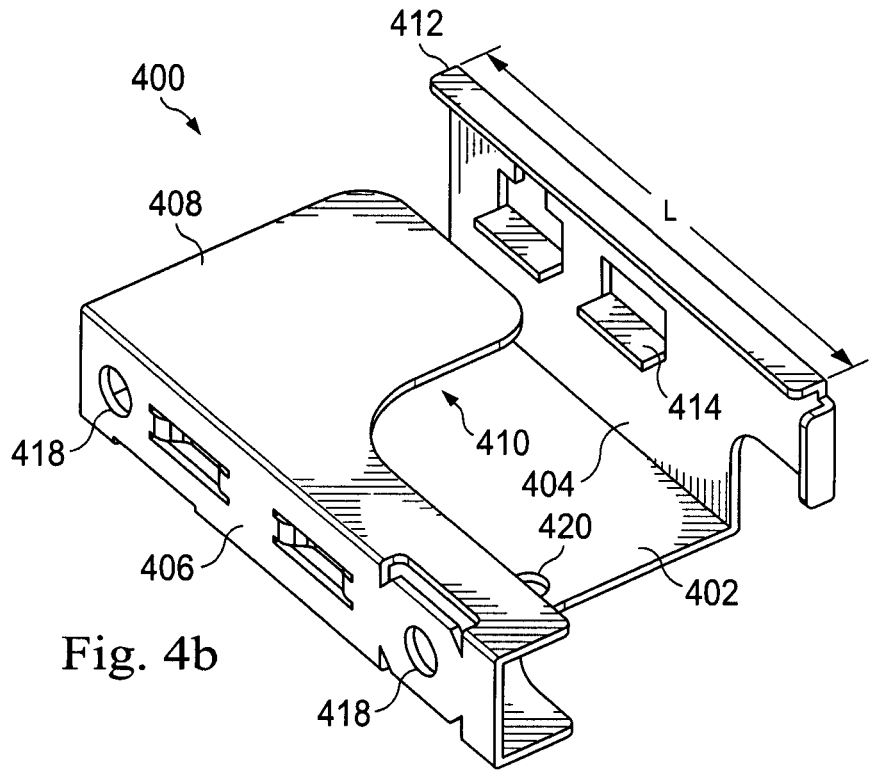
Figure 4C:
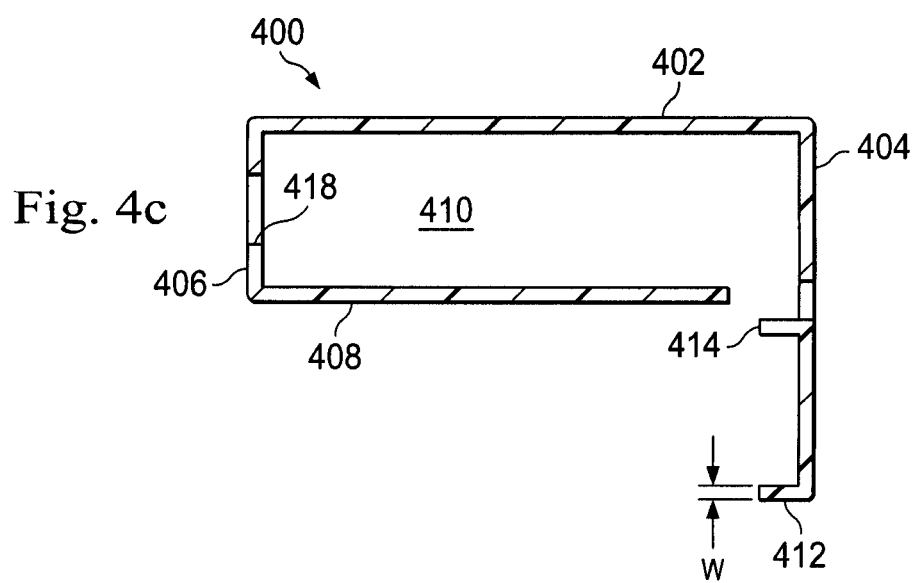
FIG. 4c is a cross-sectional view illustrating an embodiment of the module chassis of FIGS. 4a and 4b.

Referring now to FIGS. 4a, 4b, and 4c, a module chassis 400 is illustrated. The module chassis 400 includes a top wall 402, a pair of opposing side walls 404 and 406 that extend from opposite edges of the top wall 402, and a bottom wall 408 that includes a portion that extends between the side walls 404 and 406 and is oriented in a substantially parallel and spaced apart orientation from the top wall 402. A module housing 410 is defined between the top wall 402, the side walls 404 and 406, and the bottom wall 408. A retaining wall 412 extends from a distal edge of the side wall 404 opposite the top wall 402 in a substantially parallel and spaced apart orientation from both the top wall 402 and the bottom wall 408. In an embodiment, the retaining wall 412 includes a length L that is approximately 24 millimeters and a width W that is approximately 2 millimeters. A locating member 414 extends from the side wall 404 and, in an embodiment, the locating member 414 is substantially parallel to each of the top wall 402, the bottom wall 408, and the retaining wall 412. A latching module securing aperture 416 is defined by the top wall 402 and extends through the top wall 402 to the module housing 410. A pair of component securing apertures 418 are defined by the side wall 406 and extends through the side wall 406 to the module housing 410. A latch locking aperture 420 is defined by the top wall 402 and extends through the top wall 402 to the module housing 410. In an embodiment, the module chassis 400 may be fabricated from sheet metal steel (e.g., stainless steel, carbon steel, etc.) and the features on the module chassis 400 may be created using sheet metal fabrication techniques known in the art. In an embodiment, most or all of the module chassis 400 is fabricated from 0.3 mm sheet metal steel.

Figure 5A:
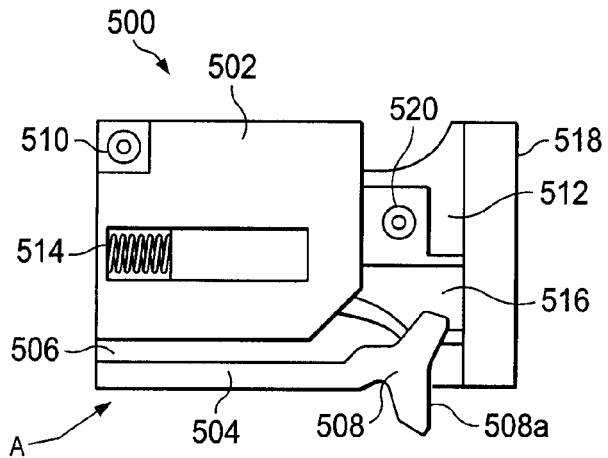
FIG. 5a is a top view illustrating an embodiment of a latching module in a locking position that is used with the component of FIGS. 3a, 3b, and 3c and the module chassis of FIGS. 4a, 4b, and 4c.
Figure 5B:
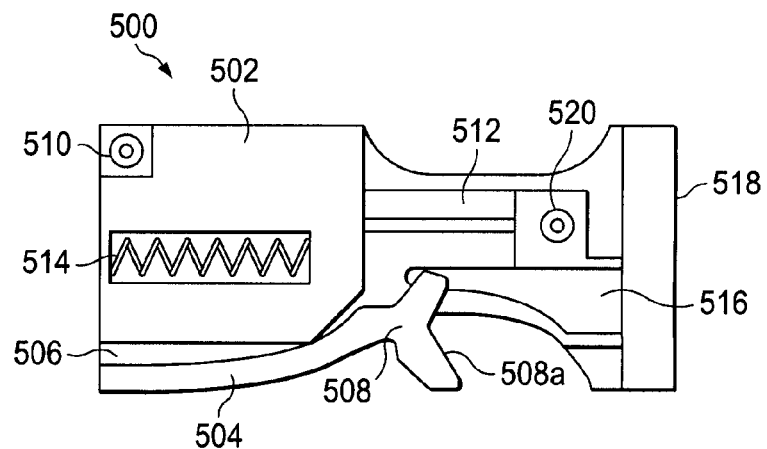
FIG. 5b is a top view illustrating an embodiment of a latching module in a unlocked position that is used with the component of FIGS. 3a, 3b, and 3c and the module chassis of FIGS. 4a, 4b, and 4c.

Referring now to FIGS. 5a and 5b, a latching module 500 is illustrated. The latching module 500 includes a latching chassis 502 having a latching member 504 that is located adjacent a channel 506 defined by the latching chassis 502. A locking member 508 is located on a distal end of the latching member 504 and includes a locking surface 508a. A module chassis securing aperture 510 is defined by the latching chassis 502. An actuating member 512 is moveably coupled to the latching chassis 502 and resiliently biased towards the latching chassis 502 by a spring 514. The actuating member 512 defines an actuating channel 516 and the locking member 508 includes a feature (not illustrated) that is located in the actuating channel 516 and couples the locking member 508 to the actuating member 512. A latching module face 518 is located on a distal end of the actuating member 512 that is opposite the latching chassis 502. A latch locking aperture 520 is defined by the actuating member 512.

In operation, the actuating member 512 may be moved into the latching chassis 502 to move the latching module 500 into a locking position A, illustrated in FIG. 5a. Moving the actuating member 512 relative to the latching chassis 502 causes the locking member 508 to move through the actuating channel 516 until the latching member 504 is substantially parallel with the channel 506. In an embodiment, the latching chassis 502 and actuating member 512 include features (not illustrated) that hold the actuating member 512 in the latching chassis 502 when the latching module 500 is in the locking position A. As can be seen, in the locking position A, the locking surface 508a on the locking member 508 extends from the latching module 500 in a substantially perpendicular orientation to the latching module 500 (although a variety of locking position orientations of the locking surface 508a and the latching module 500 are envisioned as falling within the scope of the present disclosure.) In an embodiment, the actuating member 512 may be locked into position relative to the latching chassis 502 such that the latching module 500 is locked in the locking position A by positioning a fastening member in the latch locking aperture 420 defined by the module chassis 400 and the latch locking aperture defined by the latching module 500. The actuating member 512 may then be moved away from the latching chassis 502 to move the latching module 500 into an unlocked position B, as illustrated in FIG. 5b, e.g., by first pushing the actuating member 512 towards the latching chassis 502 in order to disengage the features (not illustrated) that hold the actuating member 512 in the latching chassis 502 when the actuating member is in the locking position A. As the actuating member 512 moves away from the latching chassis 502, the locking member 508 is forced, due to its coupling with the actuating channel 516, from the position illustrated in FIG. 5a, to the position illustrated in FIG. 5b with the locking surface 508a no longer extending from the latching module 500. Thus, the actuating member 512 may be moved relative to the latching chassis 502 as discussed above in order to extend the locking member 508 and locking member surface 508a from the latching module 500 and withdraw the locking member 508 and the locking member surface 508a such that they do not extend from the latching module 500. The latching module 500 discussed above and illustrated in FIGS. 5a and 5b is commonly known as a "push-pull" latching module. However, one of skill in the art will recognize that other latching modules such as, for example, "push-push" latching modules, may be used as the latching module 500 without departing form the scope of the present disclosure.

Figure 6A:
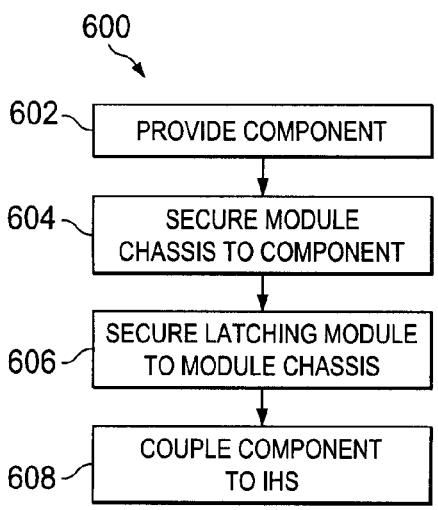
FIG. 6a is a flow chart illustrating an embodiment of a method for latching a component to an IHS chassis.
Figure 6B:
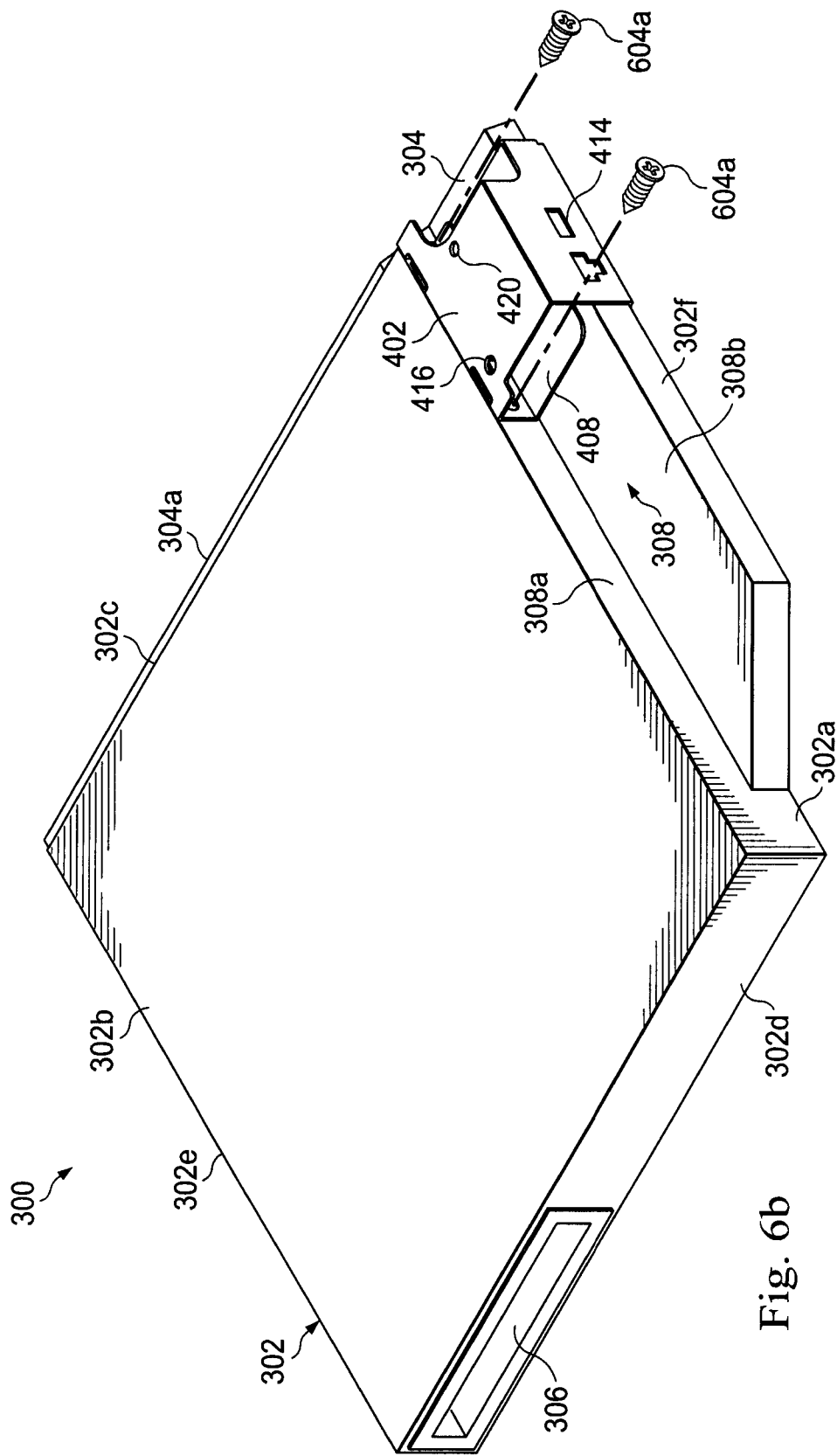
FIG. 6b is a bottom perspective view illustrating an embodiment of the module chassis of FIGS. 4a, 4b, and 4c, being coupled to the component of FIGS. 3a, 3b, and 3c.
Figure 6D:
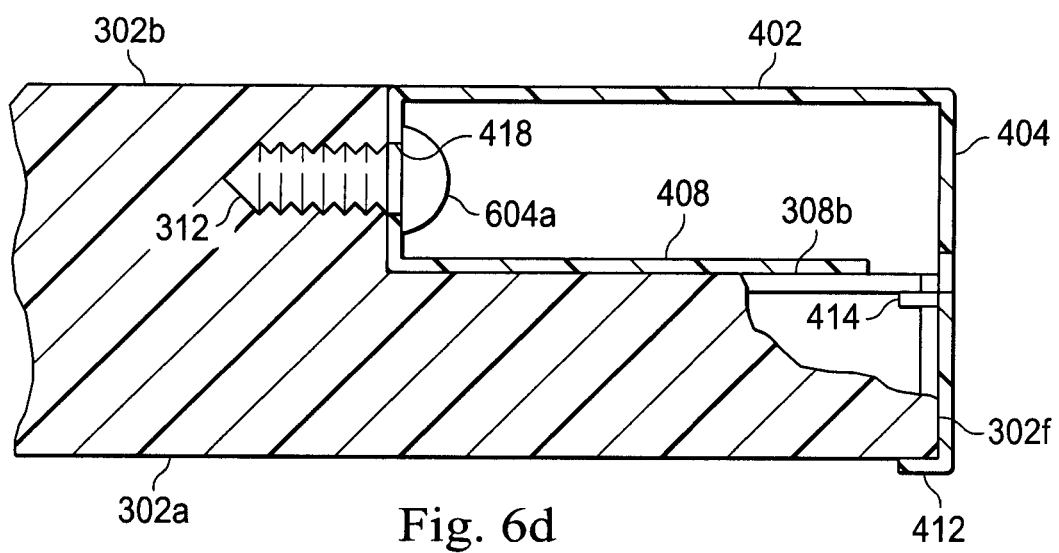
FIG. 6d is a cross-sectional view illustrating an embodiment of the module chassis of FIGS. 4a, 4b, and 4c, coupled to the component of FIGS. 3a, 3b, and 3c.

Referring now to FIGS. 6a, 6b, 6c, 6d, and 6e, a method 600 for latching a component to an information handling system (IHS) is illustrated. The method 600 begins at block 602 where a component is provided. In the illustrated embodiment, the component 300, illustrated and described above as an ODD with reference to FIGS. 3a, 3b, and 3c, is provided. The method 600 then proceeds to block 604 where a module chassis is secured to the component. In an embodiment, the module chassis 400, described above with reference to FIGS. 4a, 4b, and 4c, is positioned in the module channel 308 defined by the component 300 such that the retaining wall 412 on the module chassis 400 engages the top surface 302a of the component 300, the locating member 414 on the module chassis 400 becomes located in the module chassis locating slot 310 defined by the component 300, the bottom wall 408 on the module chassis 400 engages the second surface 308b that defines the module channel 308 of the component 300, the side wall 406 on the module chassis 400 engages the first surface 308a that defines the module channel 308 of the component 300, and a portion of the side wall 404 on the module chassis 400 engages the side surface 302f of the component 300, as illustrated in FIGS. 6b, 6c, and 6d. The module chassis 400 is then secured to the component 300 by positioning a fastening member 604a such as, for example, a screw in the illustrated embodiment, in each of the component securing apertures 418 defined by the module chassis 400 and the module chassis securing apertures 312 defined by the component 300, as illustrated in FIGS. 6b and 6d. In an embodiment, the positioning of the locating member 414 in the module chassis locating slot 310 locates the module chassis 400 in the appropriate position relative to the component 300 such that the component securing apertures 418 and the module chassis securing apertures 312 are aligned to receive the fastening members 604a. Furthermore, the positioning of the fastening members 604a in the component securing apertures 418 and the module chassis securing apertures 312, along with the engagement of the retaining wall 412 with the top surface 302a, secures the module chassis 400 to the component. Thus, it takes only the pair of fastening members 604a to secure the module chassis 400 to the component 300, as the top surface 302a acts as a module chassis retaining surface that, along with the positioning of the locating member 414 in the module chassis locating slot 310, retains the module chassis 400 in the position relative to the component 300 that is illustrated in FIGS. 6b, 6c, and 6d. In the illustrated embodiment, the module chassis 400 extends along less than half a length of the component 300 that is measured as the shortest distance between the front surface 302 and the rear surface 302d.

Figure 6E:
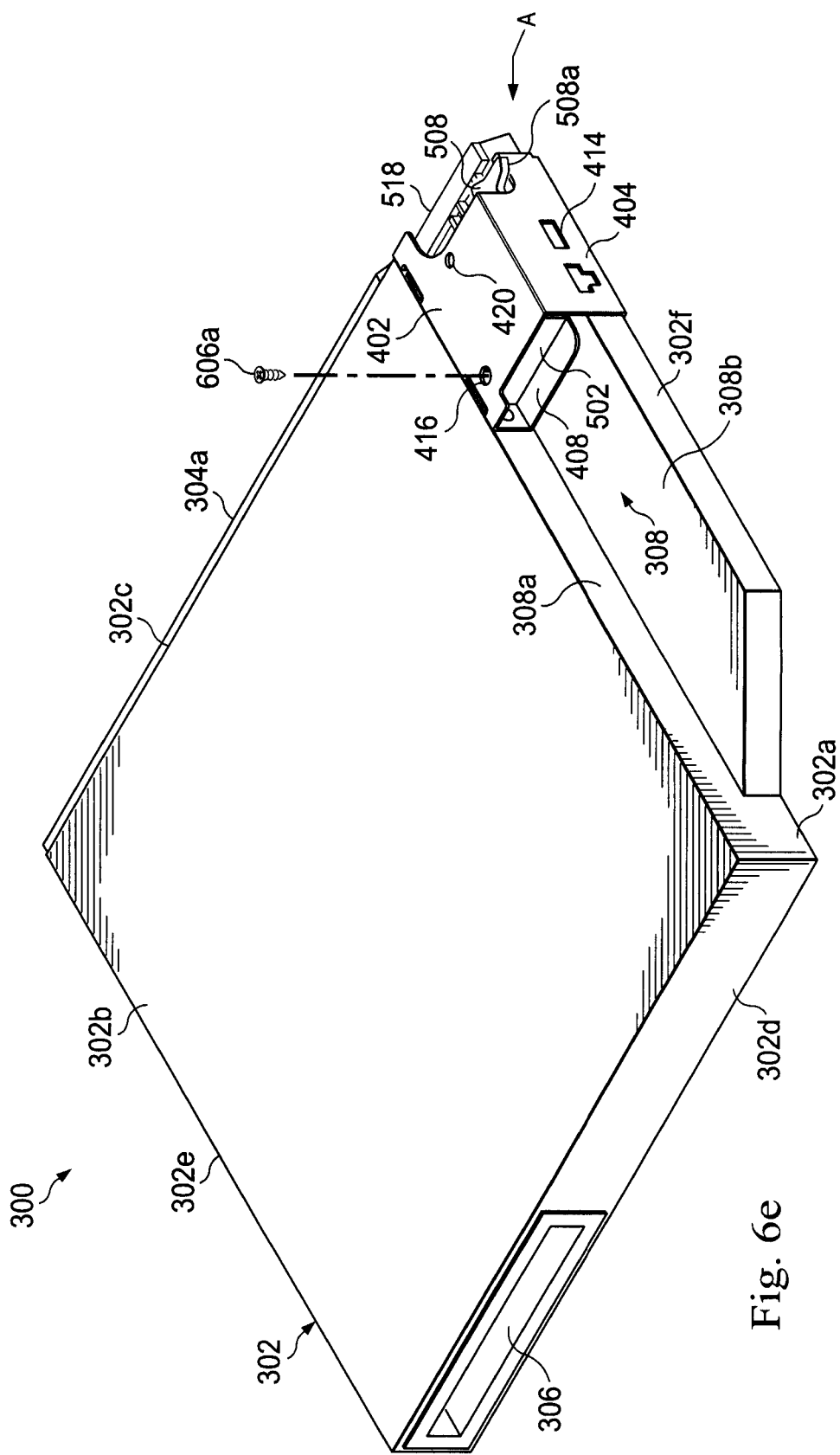
FIG. 6e is a bottom perspective view illustrating an embodiment of the latching module of FIGS. 5a and 5b being coupled to the module chassis and component of FIGS. 6b, 6c, and 6d.
Figure 6F:
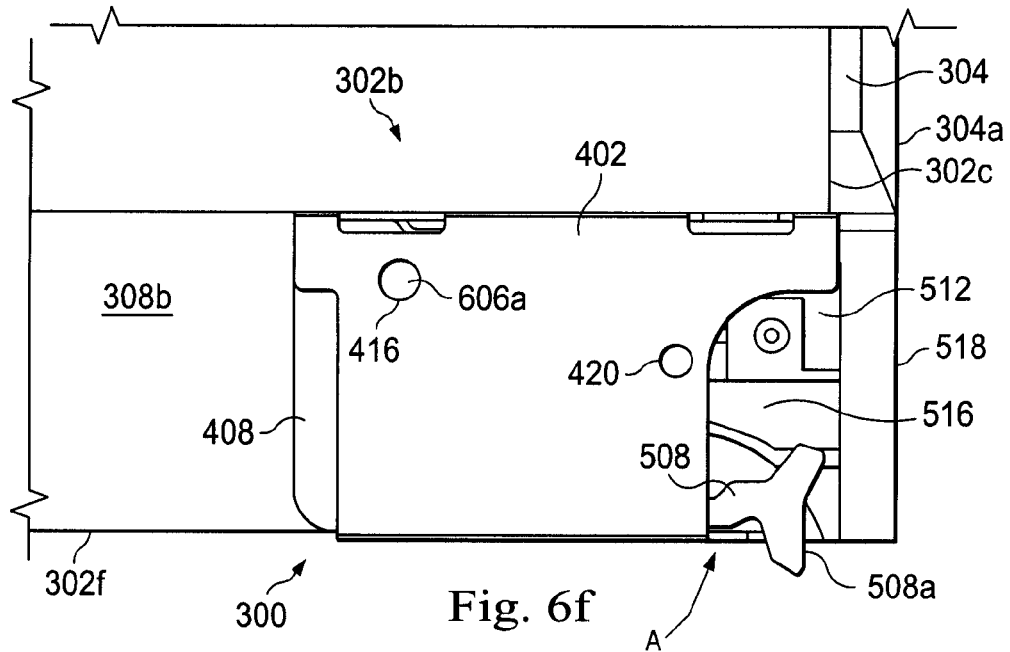
FIG. 6f is a top view illustrating an embodiment of the latching module of FIGS. 5a and 5b coupled to the module chassis and component of FIGS. 6b, 6c, and 6d and in a locking position.
Figure 6G:
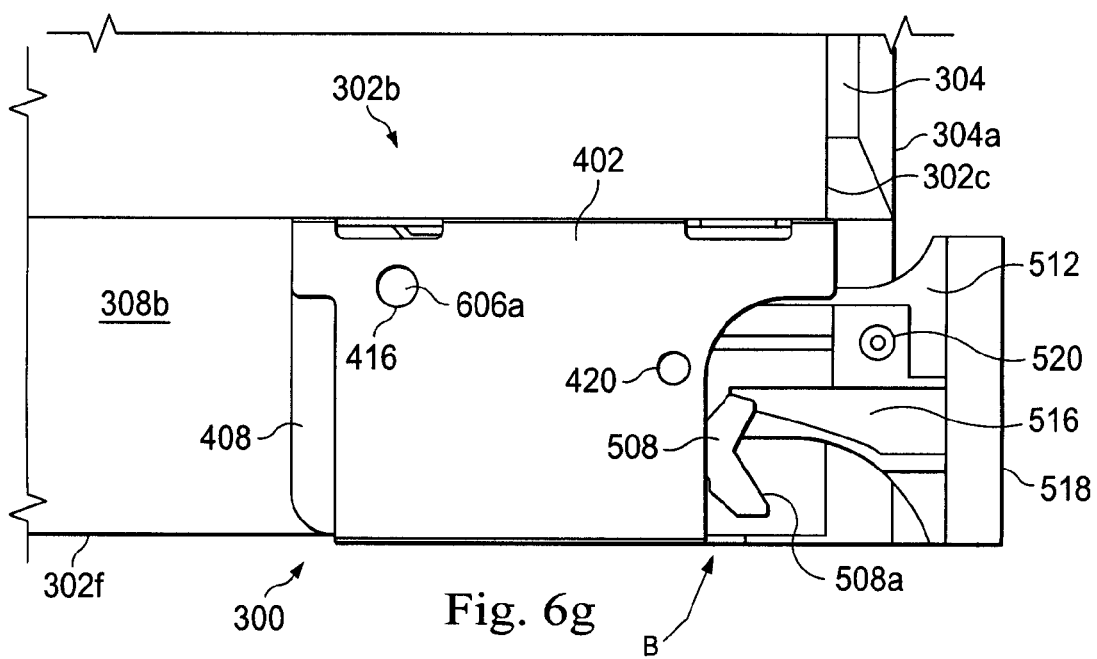
FIG. 6g is a top view illustrating an embodiment of the latching module of FIGS. 5a and 5b coupled to the module chassis and component of FIGS. 6b, 6c, and 6d and in an unlocked position.

Referring now to FIGS. 6a, 6e, 6f, and 6g, the method 600 then proceeds to block 606 where a latching module is secured to the module chassis. In an embodiment, the latching module 500, described above with reference to FIGS. 5a and 5b, is positioned in the module housing 410 defined by the module chassis 400, such that the latching chassis 502 is located in the housing 410, as illustrated in FIG. 6e. The latching module 500 may be secured to the module chassis 400 by positioning a fastening member 606a such as, for example, a screw in the illustrated embodiment, in the latching module securing aperture 416 defined by the module chassis 400 and the module chassis securing aperture 510 defined by the latching member 500, as illustrated in FIGS. 6e, 6f, and 6g. In other embodiments, the latching module 500 may be secured to the module chassis 400 using hooks, latches, and/or other fastening members known in the art. With the latching member 500 secured to the module chassis 400 and thus, the component 300, the latching member 500 may operate as discussed above with reference to FIGS. 5a and 5b. For example, when the latching module 500 is moved into the locking position A, as illustrated in FIGS. 6e and 6f, the locking member 508 moves until the locking surface 508a extends from the side surface 302f of the component 300 in a substantially perpendicular orientation to the side surface of the component (although a variety of locking position orientations of the locking surface 508a and the side surface 302f of the component 300 are envisioned as falling within the scope of the present disclosure.) In the illustrated embodiment, with the latching module 500 in the locking position A, the latching module face 518 is located immediately adjacent and coplanar with the tray face 304a on the component tray 304. In another example, when the latching module 500 is moved into the unlocked position B, as illustrated in FIG. 6g, the locking member 508 moves until the locking surface 508a no longer extends from the side surface 302f of the component 300.

Referring now to FIGS. 6h, 6i, 6j, and 6k, the method 600 then proceeds to block 608 where the component is coupled to an IHS. In an embodiment, the IHS 200, described above with reference to FIGS. 2a and 2b, is provided, and the component 300 including the module chassis 400 and the latching module 500, is positioned in the component housing 204 defined by the IHS 200 by positioning the rear surface 302d of the component 300 adjacent the component housing 204 and moving the component 300 through the component housing 204 until the component connector 306 on the component 300 engages the IHS connector 206 on the IHS 200. One of skill in the art will recognize that the latching module 500 on the component 300 may be in either the locking position A or the unlocked position B, described above, when the component 300 is positioned in the IHS 200, as the locking member 508 will not contact the IHS 200 during such positioning if the latching module 500 is in the unlocked position B, and the latching member 504 allows the locking member 508 to deflect during such positioning if the latching module 500 is in the locking position A.

Figure 6H:
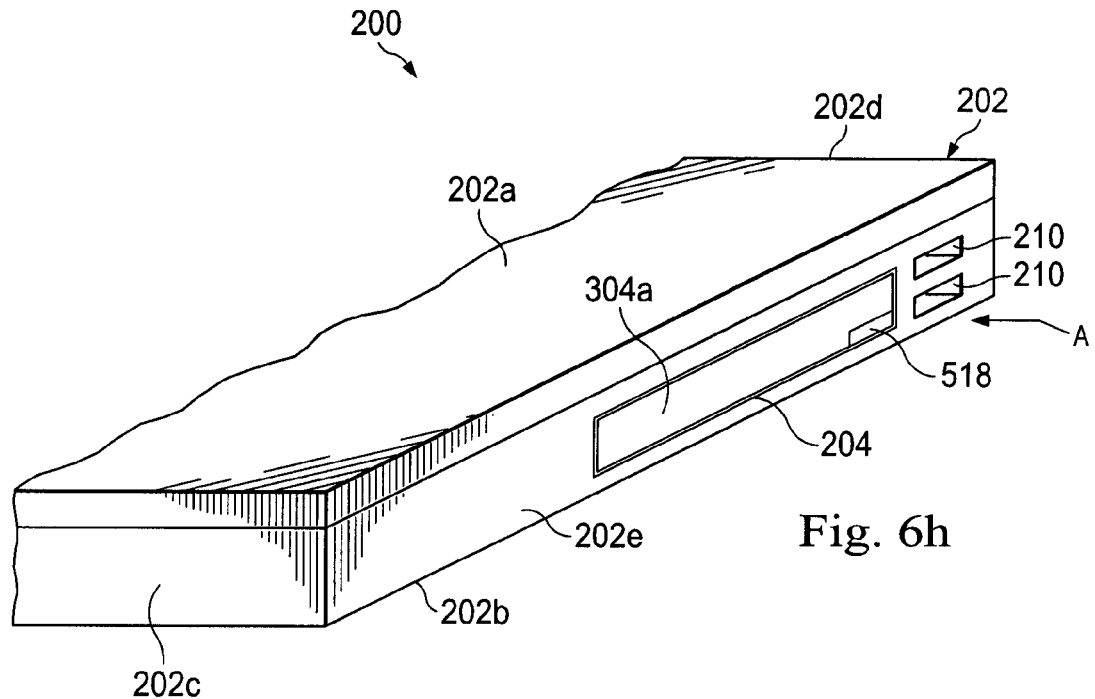
FIG. 6h is a perspective view illustrating an embodiment of the component, module chassis, and latching module of FIGS. 6e, 6f, and 6g coupled to the IHS of FIGS. 2a and 2b with the latching module in a locking position.
Figure 6I:
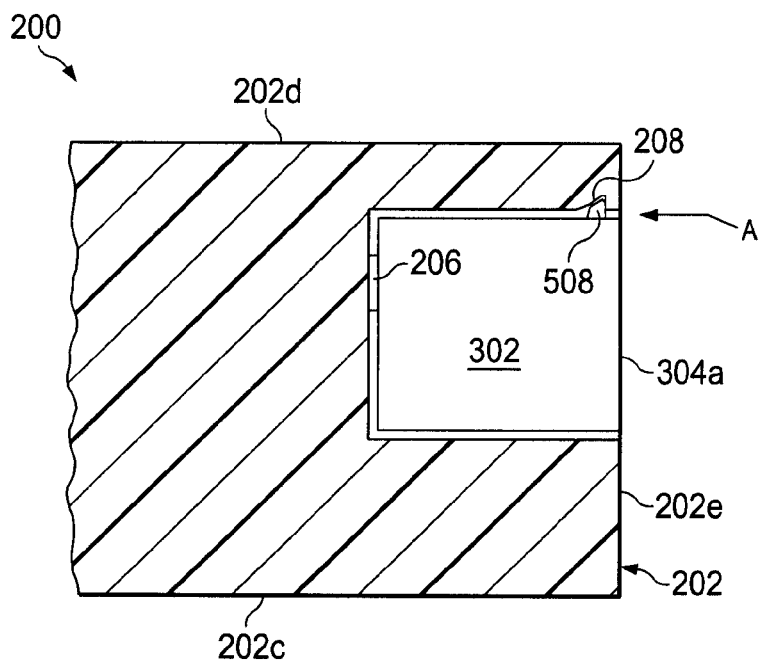
FIG. 6i is a cross-sectional view illustrating an embodiment of the component, module chassis, and latching module of FIGS. 6e, 6f, and 6g coupled to the IHS of FIGS. 2a and 2b with the latching module in a locking position.
Figure 6J:
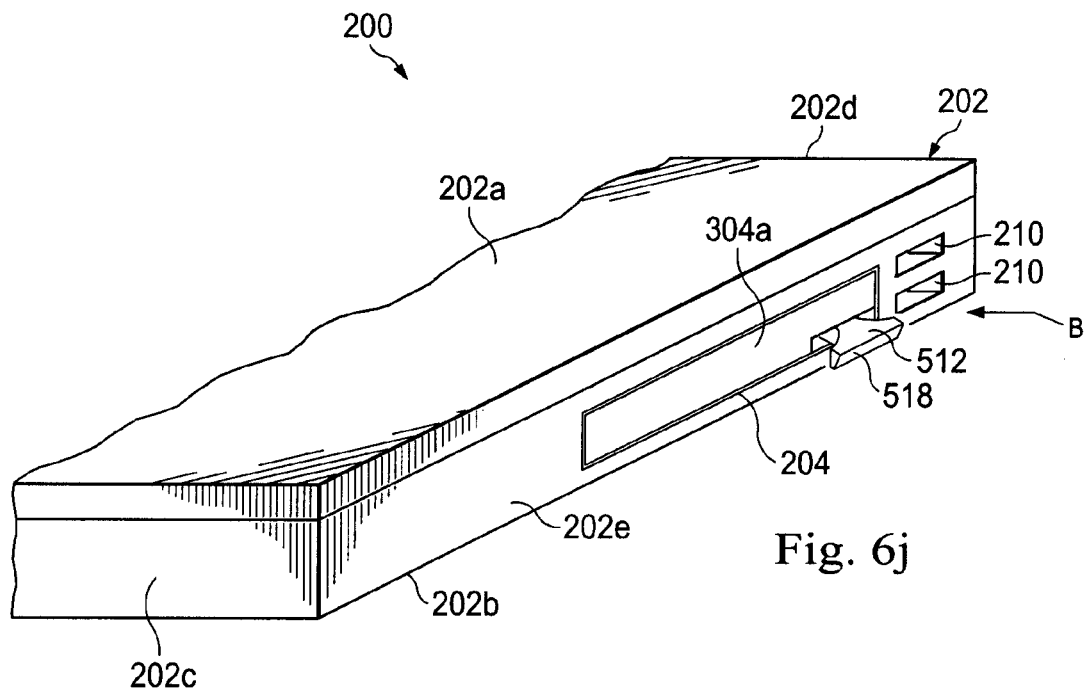
FIG. 6j is a perspective view illustrating an embodiment of the component, module chassis, and latching module of FIGS. 6e, 6f, and 6g coupled to the IHS of FIGS. 2a and 2b with the latching module in an unlocked position.
Figure 6K:
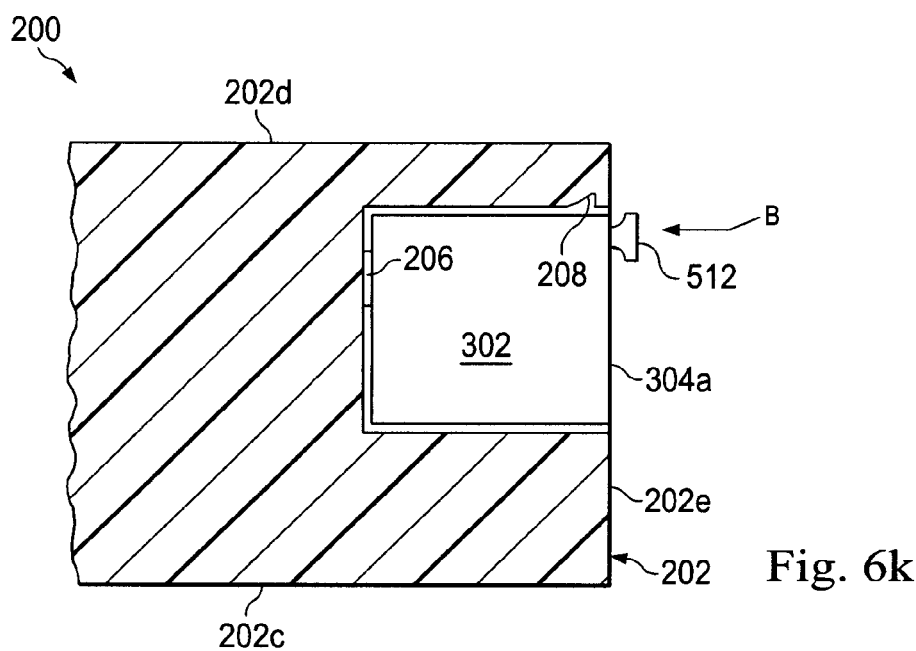
FIG. 6k is a cross-sectional view illustrating an embodiment of the component, module chassis, and latching module of FIGS. 6e, 6f, and 6g coupled to the IHS of FIGS. 2a and 2b with the latching module in an unlocked position.

With the component 300 positioned in the component housing 204, the latching member 500 may operate as discussed above with reference to FIGS. 5a, 5b, 6e, 6f, and 6g. For example, when the latching module 500 is moved into the locking position A, as illustrated in FIGS. 6h and 6i, the locking member 508 moves until the locking surface 508a extends from the side surface 302f of the component 300 and into the latch engagement feature 208 defined by the IHS chassis 202a. With the locking surface 508a extending into the latch engagement feature 208, the component 300 may not be removed from the component housing 204 without the locking surface 508a engaging the IHS chassis 202 adjacent the latch engagement feature 208. Thus, the latching module 500 in the locking position A resists the removal of the component 300 from the IHS 200. When it is desired to remove the component 300 from the IHS 200, the latching module 500 may be moved into the unlocked position B, as illustrated in FIGS. 6j and 6k, and the locking member 508 will move as discussed above until the locking surface 508a no longer extends from the side surface 302f of the component 300 and into the latch engagement feature 208. With the locking surface 508a no longer extending into the latch engagement feature 208, the component 300 may be removed from the component housing 204, for example, by pulling on the actuating member 512.

Thus, a system and method are provided that allow a latching module to be added to an industry standard component, such as an ODD having industry standard dimensions and mounting holes, such that the component may be coupled to and decoupled from an information handling system without the added costs associated with customizing the component to accept a mounting structure for the latching module.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A latching module mounting system, comprising:
   a component that defines a module channel, a module chassis locating slot located adjacent the module channel, and a pair of module chassis securing apertures located adjacent the module channel, wherein the component includes a module chassis retaining surface that is spaced apart from the module channel;
   a module chassis that is located in the module channel, includes a retaining wall that engages the module chassis retaining surface and a locating member that extends into the module chassis locating slot, and defines a module housing, wherein the module chassis is secured to the component through the pair of module chassis securing apertures; and
   a latching module that is located in the module housing and secured to the module chassis.

2. The system of claim 1, wherein the component is an optical disk drive.

3. The system of claim 1, wherein the component comprises a component chassis that houses a component tray that is moveably coupled to the component chassis and that includes a tray face, and wherein the latching module includes a latching module face that is operable to be positioned immediately adjacent the tray face.

4. The system of claim 1, wherein the component comprises a component chassis that houses a component tray that is operable to extend from a first side of the component chassis, and a component connector that is located on a second side of the component chassis that is opposite the first side, and wherein the module chassis extends along less than half the shortest distance between the first side and the second side.

5. The system of claim 1, wherein the module chassis is secured to the component with only a pair of fastening members that each engage a module chassis securing aperture.

6. The system of claim 1, wherein the latching module is operable to be actuated between a first position in which a locking member on the latching module is positioned in the module housing, to a second position in which the locking member extends from the module housing and past an outer surface of the module chassis.

7. The system of claim 6, wherein the locking member comprises a locking surface that is operable to engage an information handling system (IHS) when the locking member is in the second position in order to resist the removal of the component from the IHS.

8. The system of claim 1, wherein the module chassis retaining surface is located on an opposite side of the component from the module channel.

9. An information handling system (IHS), comprising:
 an IHS chassis that defines a component housing and houses a processor that is coupled to a IHS connector that is located adjacent the component housing;
 an IHS component that is located in the component housing and coupled to the IHS connector, wherein the IHS component defines a module channel, a module chassis locating slot located adjacent the module channel, and a pair of module chassis securing apertures located adjacent the module channel, and wherein the IHS component includes a module chassis retaining surface that is spaced apart from the module channel;
 a module chassis that is located in the module channel, includes a retaining wall that engages the module chassis retaining surface and a locating member that extends into the module chassis locating slot, and defines a module housing, wherein the module chassis is secured to the component through the pair of module chassis securing apertures; and
 a latching module that is located in the module housing and secured to the module chassis, wherein the latching module engages the IHS chassis to resist removal of the IHS component from the component housing.

10. The system of claim 9, wherein the IHS component is an optical disk drive.

11. The system of claim 9, wherein the IHS component comprises a IHS component chassis that houses an IHS component tray that is moveably coupled to the IHS component chassis and that includes a tray face, and wherein the latching module includes a latching module face that is positioned immediately adjacent the tray face.

12. The system of claim 9, wherein the IHS component comprises an IHS component chassis that houses an IHS component tray that is operable to extend from a first side of the IHS component chassis, and an component connector that is located on a second side of the IHS component chassis that is opposite the first side and that engages the IHS connector, and wherein the module chassis extends along less than half the shortest distance between the first side and the second side.

13. The system of claim 9, wherein the module chassis is secured to the IHS component with only a pair of fastening members that each engage a module chassis securing aperture.

14. The system of claim 9, wherein the latching module is operable to be actuated from a first position in which a locking member on the latching module extends from the module housing, past an outer surface of the module chassis, and into engagement with the IHS chassis, to a second position in which the locking member is positioned in the module housing and does not engage the IHS chassis.

15. The system of claim 9, wherein the locking member comprises a locking surface that engages the IHS chassis in order to resist the removal of the component from the component housing.

16. The system of claim 9, wherein the module chassis retaining surface is located on an opposite side of the component from the module channel.

17. A method for latching a component to an information handling system (IHS), comprising:
 providing a component that defines a module channel, a module chassis locating slot located adjacent the module channel, and a pair of module chassis securing apertures located adjacent the module channel, wherein the component includes a module chassis retaining surface that is spaced apart from the module channel;
 positioning a module chassis in the module channel such that a retaining wall on the module chassis engages the module chassis retaining surface and a locating member on the module chassis extends into the module chassis locating slot;
 securing the module chassis to the component through the pair of module chassis securing apertures;
 securing a latching module in a module housing defined by the module chassis; and
 positioning the component in a component housing defined by an IHS and engaging the latching module with the IHS to resist removal of the component from the component housing.

18. The method of claim 17, further comprising:
 actuating the latching module to disengage the IHS to allow removal of the component from the component housing.

19. The method of claim 17, wherein the module chassis retaining surface is located on an opposite side of the component from the module channel.

20. The method of claim 17, wherein the IHS component comprises a IHS component chassis that houses an IHS component tray that is moveably coupled to the IHS component chassis and that includes a tray face, and wherein the latching module includes a latching module face that is operable to be positioned immediately adjacent the tray face.

* * * * *